Dec. 10, 1935.  C. K. COX  2,024,092
MOLD
Filed Aug. 9, 1934
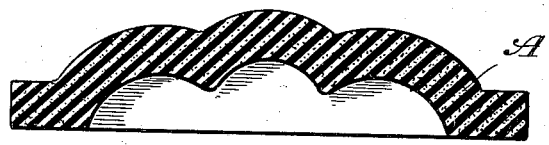
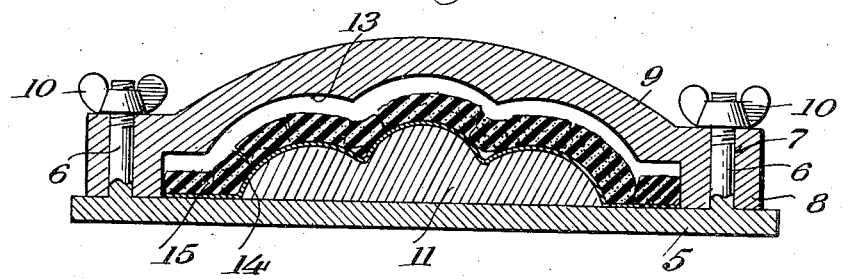
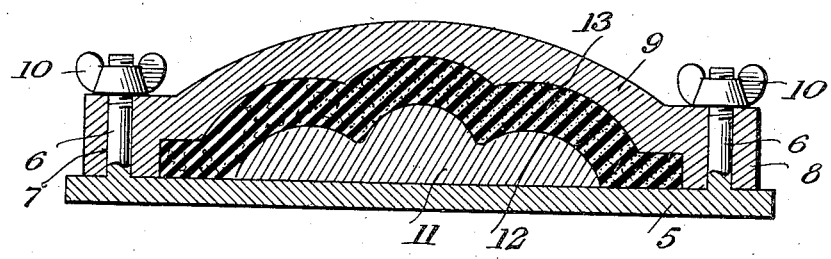
Charles K. Cox
INVENTOR
BY Victor J. Evans & Co.
ATTORNEYS Patented Dec. 10, 1935

2,024,092

UNITED STATES PATENT OFFICE 2,024,092

MOLD

Charles K. Cox, St. Louis, Mo.

Application August 9, 1934, Serial No. 739,177

2 Claims. (Cl. 18—34)

The invention relates to a method of and means for making rubber matrices or molds usable for the production of plastic articles.

The primary object of the invention is the provision of means of this character, wherein a matrix or mold made from rubber can be produced, so that in the formation of plastic articles, the rubber matrix or mold can be readily and with dispatch removed from the cast without damaging the latter and avoiding the requirement for the use of metal or gelatin molds for such purpose.

Another object of the invention is the provision of a method consisting in producing a rubber matrix or mold by first applying, by spraying or dipping, a sheet of latex, or a sheet or layer of uncured or semi-cured rubber compound, to a pattern, then superimposing upon the said sheet pieces of sponge rubber, then subjecting the latex and sponge rubber, or sheet or layer of uncured or semi-cured rubber compound, while applied to the pattern, to vulcanization while within a form and finally removing the form therefrom.

A further object of the invention is the provision of means of this character which is simple in construction, thoroughly reliable and efficient for the purpose intended, readily and easily handled, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a vertical sectional view through a matrix or mold constructed in accordance with the invention.

Figure 2 is a vertical longitudinal sectional view through the form and pattern, showing a sheet or layer of latex, or a layer of uncured or semi-cured rubber compound and uncured pieces of sponge rubber superimposed upon the latex, or a sheet or layer of uncured or semi-cured rubber compound which covers a pattern within a form for the production by vulcanization of the matrix or mold embodying the present invention.

Figure 3 is a view similar to Figure 1 showing the finished matrix or mold following the steps of the method of making the same as disclosed by Figure 2 and after vulcanization.

Similar reference characters indicate corresponding parts throughout the several views in the drawing.

Referring to the drawing in detail, there is shown a form preferably employed for the production of a rubber matrix or mold embodying the present invention and comprising a base 5, preferably made from metal, having the upstanding threaded lugs or studs 6, these being received in openings therefor, as at 7, in the rim 8 of a cover section 9 of the form. The lugs or studs 6 carry winged nuts 10 which are releasable therefrom and secure the base 5 and cover section 9 together.

Placeable within the form and upon the base 5 thereof is a pattern 11 having the ornamented or decorative surface 12, the inner surface 13 of the cover section 9 being ornamented or decorative correspondingly to the surface 12 of the pattern 11 and spaced the required distance therefrom according to the requirement of the thickness of the matrix or mold adapted for use in the production of plastic articles and embodying the present invention.

The method of making the rubber matrix or mold consists in first applying a section, layer or coating or sheet of latex, or a sheet or layer of uncured or semi-cured rubber compound, as at 14, to the surface 12 of the pattern 11 after the said pattern has been placed upon the base 5 of the form. Then superimposing upon this sheet 14, which is relatively thin, the required number of pieces of uncured sponge rubber 15, these pieces being adapted to completely cover the sheet 14 and to be superimposed thereon between the pattern 11 and the cover section 9 of the form.

The cover section 9 is made secure or clamped upon the base 5 enveloping the pattern 11 with the sheet of latex or rubber compound 14 and pieces of sponge rubber 15 and finally the form under the assembly just mentioned is subjected to heat for the vulcanization period, so that the sheet 14 and pieces of sponge rubber 15 will become vulcanized as a unit and produce the rubber mold, as indicated at A in Figure 1 of the drawing. This mold A is usable for the production of plastic articles, as for example, novelties of plastic composition, candy, cast stone, cement goods, etc. The mold A when utilized for the production of plastic articles, after the formation and setting of such articles of plastic composition, candy, cast stone, cement goods, etc., can be readily peeled or pulled off of the product without damaging or in any manner marring the surface thereof.

What is claimed is:

1. A mold of the kind described comprising a body made from rubber having a smooth impervious rubber inner surface for the production of a like plastic article, and having a porous sponge rubber exterior surface uniformly spaced from the inner surface.

2. A mold of the kind described comprising a rubber body having a smooth impervious rubber inner surface for the production of a plastic article, and having a porous friction exterior surface uniformly spaced from the inner surface and formed of chunks of sponge rubber.

CHARLES K. COX.